United States Patent [19]

Lemelson

[11] Patent Number: 4,733,049

[45] Date of Patent: Mar. 22, 1988

[54] MACHINING METHOD AND APPARATUS

[76] Inventor: Jerome H. Lemelson, 85 Rector St., Metuchen, N.J. 08840

[21] Appl. No.: 140,867

[22] Filed: Apr. 16, 1980

Related U.S. Application Data

[63] Continuation-in-part of Ser. No. 948,143, Oct. 3, 1978, abandoned, and a continuation-in-part of Ser. No. 693,416, Jun. 7, 1976, Pat. No. 4,118,139, and a continuation-in-part of Ser. No. 182,501, Sep. 21, 1971, Pat. No. 3,817,647, and a continuation-in-part of Ser. No. 775,433, Nov. 13, 1968, Pat. No. 3,476,431, and a continuation-in-part of Ser. No. 294,076, Jul. 10, 1963, Pat. No. 3,226,833.

[51] Int. Cl.$^4$ ............................................. B23K 26/00
[52] U.S. Cl. ..................... 219/121 LJ; 219/121 LE; 219/121 LV
[58] Field of Search ..... 219/121 L, 121 LM, 121 LE, 219/121 LF, 121 LU, 121 LY; 408/12, 700

[56] References Cited

U.S. PATENT DOCUMENTS

| | | | |
|---|---|---|---|
| 2,654,821 | 10/1953 | Gillett | 219/89 R |
| 2,861,166 | 11/1958 | Cargill, Jr. | 219/121 LM |
| 3,474,219 | 10/1969 | Steigerwald | 219/121 LM |
| 4,063,059 | 12/1977 | Brolund et al. | 219/121 PC |
| 4,118,139 | 10/1978 | Lemelson | 408/12 |
| 4,201,905 | 5/1980 | Clark et al. | 219/121 LG |

Primary Examiner—M. H. Paschall

[57] ABSTRACT

An apparatus and method for machining heat softenable materials such as metals, alloys and certain thermoplastic materials. In one form, radiation generated by a laser or electron gun is directed against a portion of a workpiece immediately adjacent that portion thereof which is being machined by a cutting tool such as a milling tool, lathe tool, drill, grinder or other means adapted to remove material by so called machining. The laser or other generating means for radiation is preferably supported by a mount supporting the cutting tool and is located to direct its beam immediately in advance of that portion of the work being machined so that the heat of the beam will soften that portion of the work about to be cut or otherwise machined. Other radiation generating means such as an electric arc or plasma arc generator may also be utilized.

7 Claims, 6 Drawing Figures

1

MACHINING METHOD AND APPARATUS

RELATED APPLICATIONS

This is a continuation-in-part of Ser. No. 948,143 filed 10/3/78 now abandoned and a continuation-in-part of Ser. No. 948,143 filed 10/3/78 now abandoned and a CIP of Ser. No. 693,416 filed June 7, 1976, now U.S. Pat. No. 4,118,139 and entitled Machine Tool and Method and a continuation-in-part of Ser. No. 182,501 filed Sept. 21, 1971 now U.S. Pat. No. 3,817,647; and a continuation-in-part of Ser. No. 775,433 filed Nov. 13, 1968, now U.S. Pat. No. 3,476,481; and a continuation-in-part of Ser. No. 294,076 filed July 10, 19 1963, now U.S. Pat. No. 3,226,833.

SUMMARY OF THE INVENTION

This invention relates to a method for operating on work, such as maching metal, wherein a tool is employed to form or remove material therefrom and wherein auxilliary means is used to condition the material, such as heat soften same, to facilitate its removal. In particular, the invention is concerned with the use of intense radiation generated by a laser or electron gun for controllably heating and softening a small portion of work about to be formed or removed by a tool, preferably just in advance of the tool. In a preferred form, the laser or electron gun is supported on a mount which is fixed or controllably movable with respect to the tool.

The instant invention preferably employs a master controller such as a computer or electronic microprocessor for controlling operation of both the tool or cutting device and the radiation beams generator to synchronize or cooperate both in a manner to optimize the machining operation.

Accordingly it is a primary object of this invention to provide a new and improved machine tool and method for machining or forming work.

Another object is to provide an auxilliary means and method for machining material in cooperation woth a cutting or forming tool.

Another object is to provide a method for forming material using a laser or electron beam to heat soften a small portion thereof about to be cut or otherwise formed.

Another object is to provide a control system and method for controlling the operation of a tool with respect to work and for measuring the tool and sensing the work to permit proper operation of the tool on the work.

Another object is to provide an automatic machine tool including a single measuring apparatus for measuring a plurality of functions including measurements relative to a work piece and a tool operable to perform on said work piece.

Another object is to provide an automatic measurement apparatus having a single probe which may be computer controlled to perform a plurality of measurement functions including measurement of the dimensions of a work piece, measurements of the dimensions of a tool, locating the surface of the work piece and the end of a tool and controlling the operation of the tool thereafter and detecting broken or overworn tools followed by stopping the tool or replacing the broken or overworn tool with a new tool.

Another object is to provide an automatic measurement device associated with a machine tool such as a lathe, milling machine or other form of cutting machine which device includes means for measuring the dimension of a work piece aligned with the cutting head of the tool simultaneously as the tool performs on the work so that one or more dimensions of the work may be measured and monitored during the cutting operation;

Another object is to provide a control system for a machine tool which includes means for generating signals indicative of the dimensions of a work piece between and during machining operations on the work and for analyzing said signals and comparing same with other signals such as command signals and adaptive control feedback signals and generating further signals thereof so as to maximize the machining operation and permit the precise machining of the work.

Another object is to provide an automatic inspection apparatus associated with a machine tool and employing radiation inspection means such as ultrasonic pulse-echo means, X-ray inspection means or the like and analysis means for the signals generated and received for measuring the dimensions of a work piece during the machining operation and generating signals indicative of said measuring which signals are analyzed and utilize to effect proper control of the tool;

Another object is to provide an automatic machine tool having a cutting head and tool for machining a work piece and an ultrasonic transducer associated with the cutting head or the cutting tool itself for generating and transmitting ultrasonic vibrations through the tool to the work and receiving the reflections of said vibrations from an opposite surface of the work as the tool engages and performs on the work wherein signals are generated which are indicative of a dimension of the work in direct alignment with the tool which signals are compared with reproductions of recorded signals which are indicative of either a desired finished dimension of the work where contacted by the tool or a desired dimension to be machined during the particular pass of the tool against the work, said apparatus including means for generating a corrective or error signal from the comparing means and applying same to control the movement of the tool or work to attain the desired dimension or maximize the machining operation.

Another object is to provide an apparatus for transmitting a plurality of vibrational frequencies to a cutting tool as it performs on the work for maximizing the machining operation;

Another object is to provide an apparatus for transmitting a plurality of types of vibrations to a cutting tool either simultaneously or sequentially and including a first mode of vibration which is operable to improve and facilitate the machining operation and a second vibrational mode of higher frequency and lower intensity than the first vibrations and operable to transmit inspection waves from the tool to the work to permit inspection of the work during the machining operation.

Another object is to provide an improved tool head including a vibrational transducer associated with a tool holding device such as a tool chuck or clamp for transmitting the subsonic or ultrasonic energy to the cutting tool as it performs on the work for improving the machining operation.

Another object is to provide transmitting and receiving means for ultrasonic energy coupled to or forming part of a cutting tool clamp or chuck for transmitting ultrasonic inspection waves through the tool and receiving reflections of said waves; the apparatus also including analysis means for the transmitted and received energy.

Another object is to provide an ultrasonic inspection apparatus associated with a machine tool for measuring and determining the dimensions and condition of a cutting tool forming part of the machine tool.

Another object is to provide a machine tool for performing preprogrammed, shape changing operations on work and including ultrasonic inspection means for transmitting and receiving ultrasonic energy through a coupling liquid to the work during or between machining operations to automatically measure the dimensions of the work and to provide control signals for predeterminately controlling the operation of the tool on the work.

Another object is to provide a machine tool having means for engaging and holding a work piece performed on by the tool and means for vibrating the work piece as it is machined by the tool to maximize the machining operation.

Another object is to provide a machine tool for performing a forming or cutting operation on work wherein a probe is used adjacent the forming or cutting tool to transmit vibrational energy to the immediate area of the work being machined or formed.

Another object is to provide a machine tool including means for transmitting shock waves to a work piece simultaneously as it is formed or cut to improve the forming or cutting operation.

Another object is to provide a new and improved machine tool for performing shape changing operations on work by means of a cutting or grinding device wherein a vibrational means is provided to improve the shape changing action and forms part of the cutting or grinding device.

Another object is to provide a tool head for a cutting tool and having a chuck or spindle containing a transducer supported thereby in a location and in such a manner as to permit vibrational or acoustical energy generated by said transducer to be transmitted to a tool when properly mounted on said chuck or spindle.

Another object is to provide an apparatus and method for machining material such as metal wherein shock waves are generated and transmitted to the tool and therefrom to the work being machined in a manner to improve the machining operation and improve the physical characteristics of the work machined.

Another object is to provide an apparatus operable for machining work by a combination of cutting and attrition rendered by means of shock waves.

Another object is to provide an apparatus and method for machining work and employing a cutting tool and means for vibrating same by shock waves and ultrasonic waves to improve the machining operation.

Another object is to provide an automatic machine tool having a cutting tool and means for imparting heat energy to said cutting tool as it performs a cutting operation.

With the above and other objects in view as may hereafter more fully appear, the invention consists of the novel cone structions, combinations and arrangements of parts as will be more fully described in the drawings, but it is to be understood that changes, variations and modifications may be resorted to which fall within the scope of the invention as claimed.

In the control diagrams forming part of the drawings, certain details are not shown in order to simplify the drawings. Accordingly it is assumed that the proper power supplies are provided on the correct sides of all switches, motor controls, pulse generators, counters, relays, amplifiers and the other illustrated components and subsystems to effect the proper operation of the systems as described. It is also assumed that, where necessary one-way gates or diodes are provided in the circuits shown to assure proper operation of the system. Where necessary, signal amplifiers are provided where not shown.

Figure 1:
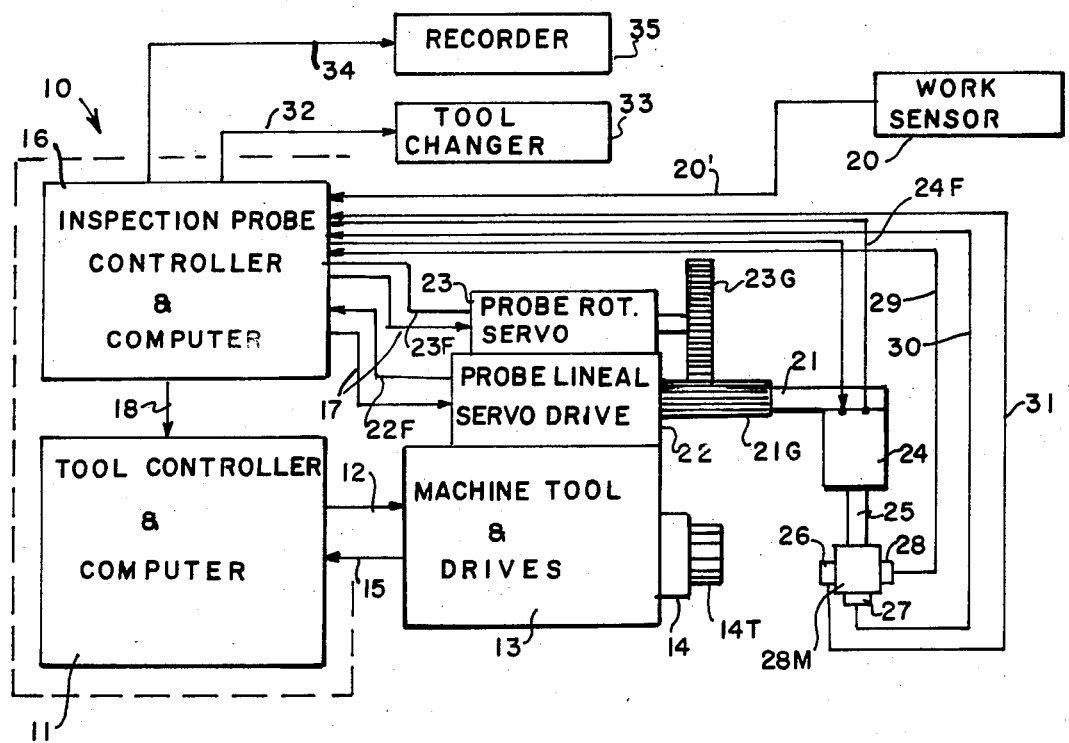
FIG. 1 is a block diagram of the basic subsystems and components of one form of the instant invention.

Referring now to FIG. 1 of the drawings which illustrate the basic components and subsystems of an automatic tool inspection and detection system 10, notation 11 refers to a computer or programmed controller 11 for controlling the operation of a machine tool 14 by controlling the tool drives 13 thereof which may comprise one or more in number, preferably three to seven drive units for positioning and operating the cutting tool 14T in a plurality of directions and attitudes relative to a work piece which is predeterminately disposed although not shown adjacent the tool. Common control signals generated by the computer 11 are transmitted on a plurality of channels such as contained in a coaxial cable 12 extending to the tool drives 13 while feedback signals generated by sensing means associated with the tool are transmitted on a feedback channel line 15 extending to the computer 11.

Disposed adjacent the tool and preferably supported by the mount for the tool head 14 is an inspection probe 22 having an extendable and rotatable arm 21 which is either moveable with the tool head so as to depend at least in part on the computer 11 for positioning a sensing means associated with the arm and to locate said sensing means predeterminately with respect to the head and cutting tool.

Shown supported by the housing for the inspection probe mount 22 is a housing 23 containing a reversable and controllable motor with a gear 23G secured to the output shaft of said motor and coupled to a gear 21G on the probe arm 21 for rotating said arm. An inspection probe computer and controller 16 is provided and contains output circuits 17 which extend to control the reversable servos or motors located within housings 22 and 23 for rotating and projecting and retracting probe arm 21.

Supported at the end of arm 21 is a servo motor 24 operable to project and retreat a second arm 25 containing supported at its end a plurality of transducers 26–28. Transducer 26 is located and operable to sense surfaces which are normal to the axis of rotation of the cutting tool 14T and disposed therebetween and the end of the cutting tool. Accordingly transducer 26 may sense the end of the cutting tool as well as surfaces of the work and may be used to determine such variables as location of the end of the cutting tool with respect to the tool head 14, breakage or excessive wear of the cutting tool or surfaces of the work piece disposed between transducer 26 and the tool head 14.

Transducer 27 is located on the other side of a mount 25M supported at the end of probe arm 25 and is operable to sense and locate surfaces of the work disposed in alignment therewith. Transducer 28 is located at the very end of mount 28M and may be positioned in direct alignment with the peripheral surface of the cutting tool 14T for sensing said surface. The transducer 28 may therefore be utilized to sense and locate the surface of the cutting tool 14T, determine if the tool is broken or excessively worn, and, depending on the sensitivity of the sensor, be used to determine the actual wear of the cutting tool.

Notations 29, 30 and 31 refer to electrical circuits extending from the transducers 26–28 to the inspection probe computer 16 on which circuits signals are generated which are indicative of the operation of said transducers, e.g. either generated when the transducer senses a surface by contact or radiation sensing means or generated if the transducer is of the pulse-echo type and receives a signal reflected from the surface of the tool or work.

A work senser 20 is suitably disposed supported either by the tool housing, the support for the inspection probe, a conveyor along which the work is carried to the tool or on a separately supported mount and is located to generate a signal upon sensing a predetermined portion of the work or a work carrying fixture. The work sensor 20 may comprise a limit switch, photoelectric detection device or series of detectors for generating a plurality of signals which may be analyzed by the computer 16 to identify a particular unit of work of a plurality of different work units moveable along the conveyor to the tool. Said work sensor 20 may also comprise means for scanning a code disposed on the work itself or the work carrying fixture and transmitting said code to either or both the inspection probe computer or tool computer both of which, incidentally, may comprise a single computer which is properly programmed and wired to effect the functions capable of being performed by the blocks 11 and 16 of FIG. 1. The work sensor 20 is shown connected by means of a line 20' to the inspection probe computer 16 although said connection may also extend to or solely be connected with computer 11.

Notations 22F, 23F and 24F refer to feedback lines extending to the inspection probe computer 16 from the servo motors driving and rotating the probe arm 21 and projecting and retracting arm 25.

The system shown in FIG. 1 may be utilized to perform a plurality of automatic machining and inspection functions associated with the machining operation. The inspection probe and the transducers associated therewith may be utilized to sequentially inspect the cutting tool 14T to determine its location with respect to the tool head 14 and accordingly the work, a function which may be initiated each time a new cutting tool is inserted in the tool head. It may also be utilized at the end of each machining cycle or each operation in which the tool and work are separated to inspect the tool for breakage or excessive wear. Furthermore, the inspection apparatus may be utilized to locate one or more surfaces of the work with respect to the tool and tool head and finally to inspect and generate signals which may be analyzed by the computer 16 to determine the actual dimensions of the work prior to, during and after machining for automatically controlling the operation of the tool. Accordingly, communication is effected between the inspection probe computer 16 and the tool computer 11 by means of a circuit or plurality of circuits 18 so that, in effect, inspection adaptive control signals may be transmitted to initiate or correct the operation of the tool.

If it is determined by the inspection probe that a tool is excessively work or broken, a signal is generated by the inspection probe computer 16 and transmitted on a line 32 to operate an automatic tool changer 33. Also shown in FIG. 1 is an output 34 from the inspection computer 16 to a recorder 35 for recording signals representative of automatic measurements effected by means of the probe and computer.

It is noted that the transducers 26, 27 and 28 which are utilized in FIG. 1 to detect surfaces of the tool cutter and work towards or against which each is driven may be replaced by a single transducer disposed at the end of probe arm 25 and shaped so as to movable into engagement with surfaces of both the work and tool as described for generating detection signals which may be applied to determine both work and tool dimensions as defined herein and in my U.S. Pat. Nos. 3,605,909 and 3,226,833. In its simplest form, such a universal transducer may comprise a conducting metal rod with a rounded tip for contacting surfaces of the work and tool which extend parallel and normal to the longitudinal axis of the probe arm wherein an electrical circuit is completed to generate the described surface detection signals upon making such surface contact. The transducer may also comprise one or more pressure switches, or other suitable electrical, electro-mechanical electro-magnetic, electro-optical or capacitance devices operable to detect contact with or proximity to the tool or work surfaces. The detection signal may also be generated by a fluidically operated sensor such as a fluid-amplifier connected to a passageway in the probe arm wherein air ejected from the end thereof upon contact with the work surface or the tool is changed in flow thus generating a signal which is sensed and applied to effect control of the apparatus described as hereinbefore described.

Figure 2:
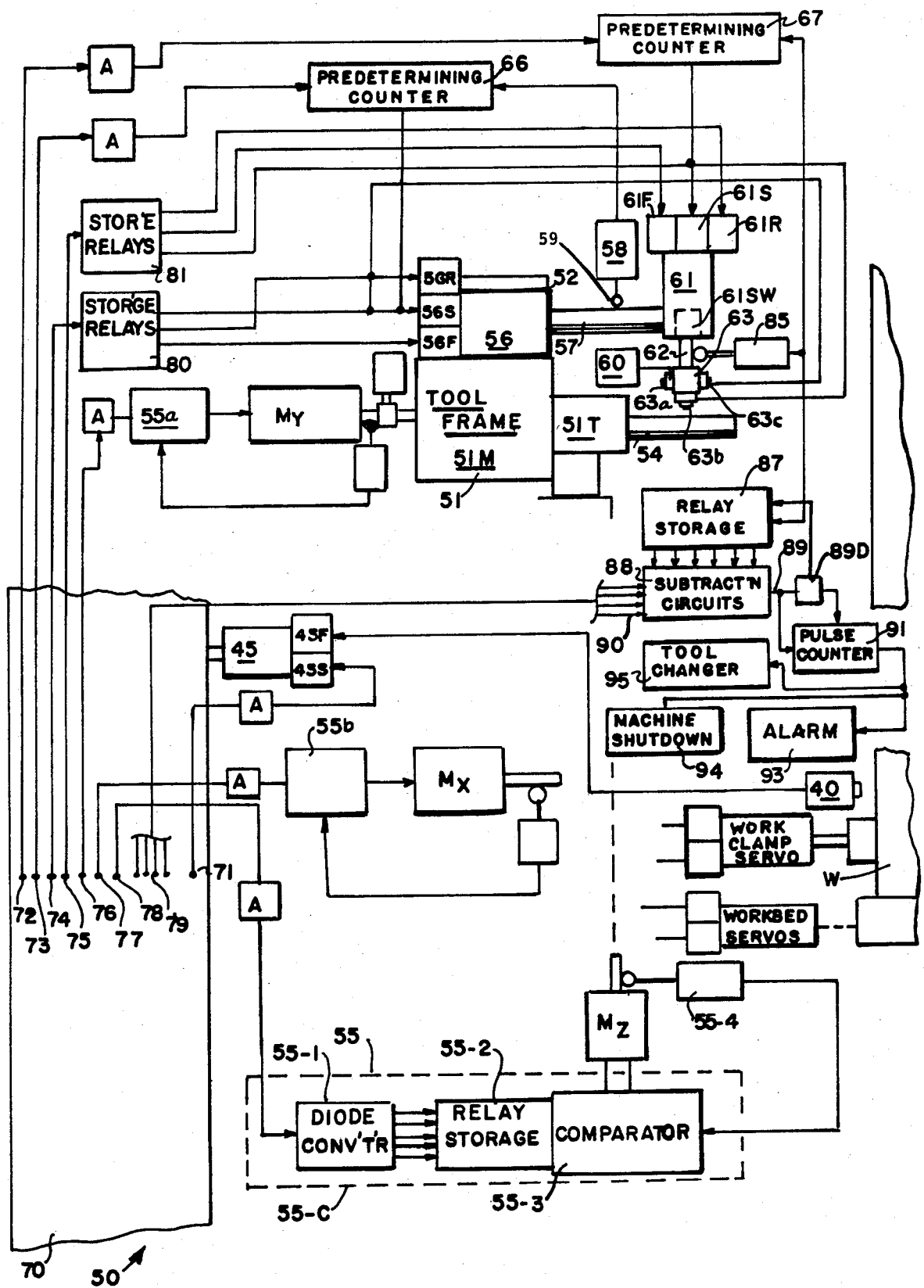
FIG. 2 is a schematic diagram showing further details of a system having the features shown in FIG. 1.

FIG. 2 illustrates further details of a tool and work inspection system for performing a plurality of inspection functions relative to a workpiece and the tool itself as described. A single controller or computer is provided for controlling the operation of both the tool and inspection probes wherein command control signals are generated from a series of recordings provided on a record member such as a card ir magnetic tape or other form of record member such as a printed or punched tape which is intermittently driven on a transport by a signal controlled motor 45.

In an automatic cycle of operation, a start-cycle signal is generated either by manual pushbutton or a detector 40 such as a limit switch detecting a surface of the workpiece W or its holding fixture when it is disposed at or adjacent the machine tool 51. The signal generated by detector 40 is passed to the start control 45F of tape drive motor 45 and the tape 70 is driven past a plurality of transducers 72–79 which generate command signals for effecting control as will be described. Transducer 71 generates a stop signal which is fed to the stop control 45S of motor 45 after all command control signals have been generated for effecting a single cycle of operation.

Transducers 72 and 73 generate respective pulse trains each of a predetermined number of pulses which are applied to preset respective predetermining counter controllers 66 and 67 which, respectively operate to control the degree of movement of a first probe arm 57 in a direction substantially parallel to a cutting tool 54 and a second probe arm 62 in a direction substantially normal to the rotational and longitudinal axis of the tool.

The apparatus of FIG. 2 includes a mount 51M for supporting a tool head 51T and a probe head 52. The probe includes a first arm 57 driven by a reversible controlled motor 56 parallel to the longitudinal axis of the tool 54 whih may comprise a milling cutter, drill or other tool for performing operations on work. Supported at the end or arm 57 is a second reversible controlled motor 61 having an output shaft 62 which is driven thereby in a direction normal to the longitudinal axis of the tool 54. Disposed at the end of arm 62 is a mount 63 containing a first sensor 63a facing the tool head 51T, a second sensor 63b facing the opposite direction to sensor 63a and a third sensor 63c facing the tool 54.

The sensors may comprise limit switches of the electromechanical type or detectors of any known type for detecting surfaces immediately adjacent thereto in accordance with the movements of the mount 63 as determined by the signals generated as reproduced from the record member 70.

A group of command-control signals reproduced by transducer 74 from tape 70 are fed to a bank or banks of storage relays 80 which retain commands determined by said signals for activating the start and stop controls 56F and 56B of the motor 56. These These command-control signals are read out of relay storage and applied to start and stop the motor driving probe arm 57 in accordance with feedback signals generated as will be described. A second relay storage bank or banks 81 receives command control signals from a command transducer 75 scanning the record member 70 and is connected to the forward and reverse drive controls 61F, 61S and 61R of motor 61.

Notations Mx, My and Mz refer to respective motors which are operable as described in application Ser. No. 775,433 by respective automatic controllers 55a, 55b and 55c in response to signals generated by respective transducers 76, 77 and 78 scanning command control recordings on the record member 70 after certain inspection and detection functions have been performed by the inspection apparatus illustrated.

In one typical operational cycle, a first signal is generated by relay storage means 80 and passed to the start control 56F of probe motor 56 causing it to drive arm 57 outwardly towards the work. A rotary limit switch 58 having a wheel 59 supported to ride on and be driven by movement of probe arm 57 is operable to generate pulses with respective incremental movement of said arm 57 which pulses are transmitted as feedback signals to the preset counter 66. When counter 66 uncounts, it generates a control signal on its output and feeds same to the stop control 56S of motor 56 positioning sensor mount 63 in alignment with a predetermined portion of tool 54. The control signal generated by counter 66 is also fed to the start control 61F of motor 61 driving probe arm 62 from a retracted position, towards the tool. A rotary limit switch 85 is operable to generate pulse signals with incremental degrees of movement of arm 62 which signals are fed to a relay storage bank 87 and held in binary form on outputs thereof connected to a binary subtractor 88. The binary subtractor 88 receives numerical binary signals on a line 90 which have been reproduced from recordings by a bank of tranducers 79 scanning respective record member 70 which latter signals are indicative of a desired dimension such as the diameter of the cutting tool 54 when in an unworn and unbroken condition. The subtractor 88 compares or subtracts the numerical value of the signals generated by 87 from the binary signals received on lines 90 from transducer bank 79 and generates difference signals indicative of the numerical difference between the distance moved by arm 62 when sensor 63c senses the surface or cutting edge of tool 54 or travels therebeyond as in the case of a broken tool. The difference signals are fed as pulses on an output 89 of 88 to a pulse counter 91 which has been either manually adjusted or preset by signals reproduced from another channel of the tape by a transducer (not shown). The counter 91 is preset to uncount if the signals generated by subtractor 88 are greater in number than a specified amount equivalent, for example, to a reduction in diameter of the tool due to wear beyond which it may no longer be operated effectively or indicative that the tool is missing or broken. If the pulses received by counter 91 equal or exceed the preset value, a pulse is generated on its output which is transmitted to an alarm 93 alerting an attendant. The same pulse may be transmitted to either shut down the machine, open a switch preventing further operation of the tape drive motor 45 so as to prevent the generation of command control signals for controlling operation of the tool drive motors or to control one or more motors operable to effect changing of the cutting tool. Notations 94 and 95 respectively refer to switchea and controls which are operable in response to the signal generated on the output of counter 91 for respectively preventing further operation of the motors driving the machine tool head 53 and operating an automatic tool changer of conventional design for replacing the tool with a new tool. In another mode of operation, the signal generated by counter 91 may be operable to initiate operation of an apparatus, not shown, for repairing, resetting and/or resharpening the tool either while mounted on the tool head 51T or after its removal therefrom.

A branch output 89a of subtractor 87 extends to a delay relay 89D operable for resetting counter 91 and clearing relays 87 a time delay after 89D has first become activated to condition it for the next cycle.

Signals generated from tape 70 may thereafter be operable to control operation of the probe in detecting one or more surfaces of the work to measure same or to initiate tool movement and operation as described in my application Ser. No. 775,433. For example, probe arm 62 may be retracted by a reproduction of the signal generated by sensor 63c fed to the reverse control 61B of motor 61 to position said arm at a fully retracted position at which it may be stopped by an over-ride limit switch 61SW activated by a pin on the shaft 62 until it is command controlled to operate again or motor control 61B may be activated by a signal reproduced from record member or tape 70. If the counter 91 has not generated a signal indicating that tool 54 is broken or excessively worn, the signal generated by closure of switch 61SW may be applied to the start control 45F of motor 45 and initiate operation thereof to drive the record member 70 so as to cause the command control signals for controlling operation of the machine tool motors Mx, My and Mz to be reproduced from their respective channels of the record member and applied to control the machine tool in performing a sequence of programmed operation on the workpiece W position adjacent the tool as described in copending application Ser. No. 775,433.

Controller 55c is illustrated in detail and includes substantially the same components or sub-systems found in the other controllers 55a and 55b respectively controlling motors My and Mx. Digital command signals are reproduced as a digital pulse train defined by recordings on respective channels of the recording member 70. For the control of motor Mz command control signals or messages in the form of digital pulse recordings are reproduced by transducer 78 from the recording member 70, amplified and fed to a diode converter 55-1 which converts the series pulse codes to parallel codes which are set up in relay storage in a relay storage bank 55-2 containing precision resistors. The contacts of the storage unit relays set up the resistance bank in unit 55-2 so that the value set-up is proportional to the digital information recorded on the channel of the recording member or tape 70 which is scanned by the reproduction transducer 78. The relay storage unit 55-2 introduces a resistance proportional to the numerical value of the signals reproduced from the tape into a self-balancing bridge which forms part of a comparator device 55-3. A feedback signal is generated during the operation of the motor Mz by means of a response potentiometer 55-4 which is coupled to the shaft of the controlled motor Mz and is used to control the operation of said motor until the bridge is balanced or a null condition exists whereupon the motor will stop with the tool mount and head 53 predeterminately located with respect to the work. Of course, as additional signals are generated on the output of the reproduction transducer 78 the motor Mz will continue to operate in accordance with the value of said signals to define either point-to-point positioning control of the tool head and mount for continuous movement control thereof as one or more of the other motors My and Mx driving said tool are simultaneously or sequentially operated therewith. Reproduction head 76, riding on another channel of the tape 70, reproduces series digital command signals as the recordings thereof come into operative relationship with said pickup head and said signals are fed to operate controller 55a controlling motor My. Similarly, other signals recorded as digital pulse trains on another channel 77 of the recording member 70 are fed to a controller 55b similar to controller 55a which controls operation of the motor Mx in driving the tool head mount 51M in a direction normal to the directions the motors My and Mz drive said tool head mount to provide predetermined three-axis positional control of said tool head and mount.

A number of modes of operation of the probe and tool of FIG. 2 may be effected depending on the sequencing and characteristics of signals recorded on record member 70. For example, if sensor 63c is of the proximity type, it may be positioned proximate to tool 54 while said tool is rotating and utilized to generate a signal which may be analyzed to indicate the diameter of the tool or provide a signal or signals which are representative of the variation of the diameter of cutting edges or blades of the tool from their diameter when the tool is new or sharpened properly. By comparing this signal with a signal generated while the transducer 63c is in the same position relative the rotating tool while the tool is new and properly dimensioned, an indication may be had of tool wear, breakage or deflection. Feeding the two signals to a summing amplifier or digitizing both and feeding the results to a binary subtracting circuit, will provide signals outputs which will be indicative of variations in the diameter or shape of the tool, tool deflection or other desired variables.

In another mode in which the apparatus of FIG. 2 may be operated, the probe transducer 63a may be positioned by suitable signals generated from the record member 70 for properly controlling operation of motors 56 and 61, to cause said transducer to sense the end of the tool, and by electrically indicating the location of probe arm 57 when the sensor 63a senses the tool end generating signals which may be used to effect either or both the functions of electrically determining the deviation of tool length from a standard length which may be an indication of wear or tool breakage. The same controlled operation of the probe may be used to electrically determine the distance from the end of the tool when detection occurs to the surface of the work or to a reference location for the work. The signal so generated may be applied to correct and properly automatically control the operation of the tool thereafter.

The output of rotary limit switch 58 may also be passed to a counter or code generator which, when pulsed by the signal generated by sensor 63a will provide signals indicative of the location of shaft 57 and sensor 63a upon sensing the end of the tool. The same function may be performed by an analog-to-digital convertor 60 shown as operatively coupled to be driven as arm 57 is moved longitudinally, and having an activating input connected to sensor or limit switch 63a such that the converter will generate output signals which are indicative of the position of the shaft and hence the location of the end of the tool when the sensor senses same. These signals may be recorded or compared with standard signals reproduced from the record member 70 and fed to a comparator as described to determine variations in the location of the end of the tool from a predetermined location.

It is noted that the three surface sensors 63a, 63b and 63c of FIG. 2 which may comprise separate contacters or proximity detectors, may be replaced by a single sensor such as an electrical conducting rod with a tip adapted to sense by touching the workpiece and completing an electrical circuit which may include the tool and work and an indicating means so as to electrically indicate contact with either tool or work and thereby effect location of said surface as hereinbefore described.

Figure 3:
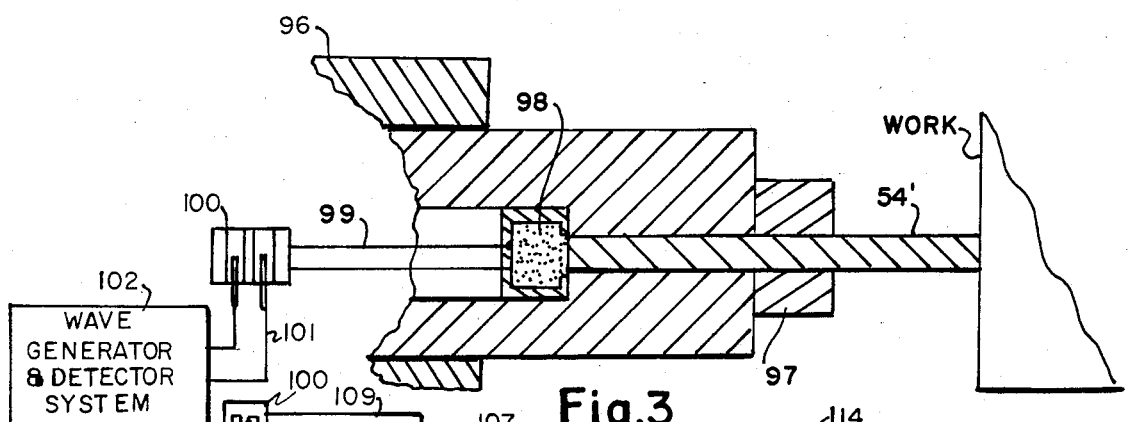
FIG. 3 is a schematic diagram showing a modified form of the invention.
Figure 4:
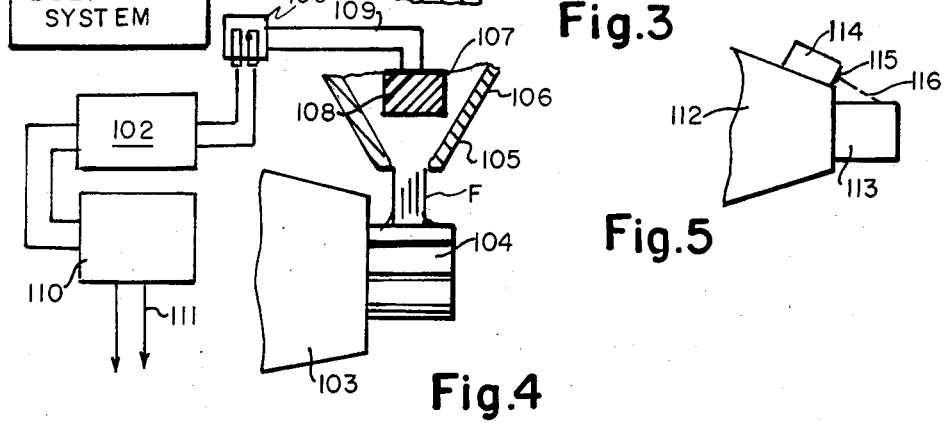
FIG. 4 is a schematic diagram of a modified form of FIG. the invention employing vibrational energy applied to a tool.
Figure 5:
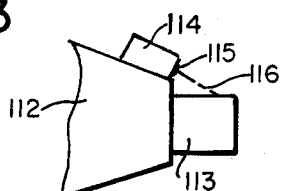
FIG. 5 is a plan view of a modified tool arrangement.

While FIGS. 1 and 2 have illustrated apparatus for inspecting a tool while stationary or in operation by the controlled movement of a probe to the vicinity of the tool, inspection radiation generating and receiving means may also be supported by the machine tool bed, tool head, tool chuck or spindle or the tool itself to effect automatic inspection of the tool and/or the work engaged by the tool while the tool is held stationery or in motion performing on the work. FIGS. 3–5 show several configurations and arrangements for coupling radiation generating means to the tool, tool check, tool head or spindle and operating same to perform automatic inspection operations on the tool and, in certain instances, the work.

In FIG. 3 a tool check 97 forms part of a machine tool such as a milling machine, drilling machine or other known type of cutting tool and is adapted to be power rotated within the tool head 96. The chuck or spindle contains conventional means for releasably holding a cutting tool 54' in engagement with an electromagnetic transducer or piezoelectric vibrator 98 so as to permit the vibrations generated by the transducer to be transmitted along the tool for inspection purposes. The transducer 98, which comprise any suitable electrically activated material such as barium titanate or lead zirconate may also be a magnetostrictive transducer and may be directly coupled to the end of the tool as shown or may be coupled to the tool through a suitable coupling device or horn supported within the tool head or chuck. If supported within the chuck or spindle, the transducer may rotate therewith. If supported within the toolhead, said transducer may be held stationery while the tool rotates wherein a liquid or rotary coupling means is utilized or the transducer is moved by a solenoid or motor into engagement with the end of the tool or coupling means therefore when the tool stops rotating or for short periods of time while it is rotating.

Electrical energy is conducted to the transducer 98 through wires or cable 99 which extend to a rotary electrical coupling 100 supported by the tool head. The brushes of the coupling 100 are connected by wire or cable to an electrical wave generator 102 which includes suitable electrical oscillation means or an alternator for generating suitable electrical energy for driving the transducer 98. In one mode of operation of the apparatus of FIG. 3, the transducer 98 may be of the transmitter-receiver type capable of coverting pulsed electrical energy into pulsed acoustical energy, transmitting same along the tool, and in certain instances from the tool to the work, and receiving reflections thereof from the end of the tool or other surfaces of the tool and/or work and reconverting the reflected acoustical pulses to electrical signals which are transmitted to detection means located in the system 102. The frequency modulated ultrasonic energy so generated and received may thus be used to inspect the tool and in certain instances the work, to determine the physical characteristics of the tool and work such as dimensions, wear, breakage and the like as defined above. The generator and detection system 102 contains pulse generating and echo signal receiving circuitry of the type provided in U.S. Pat. Nos. 2,280,226 and 2,593,865 and may be further modified to include means for automatically analyzing the received electrical signals generated by the transducer when modulated by the reflections of the transmitted ultrasonic pulses. The output of the detector circuitry of system 102 may be connected to an oscilloscope for visual analysis of the reflected energy and to a digital computer including digitizing means for the signals and comparator means for comparing the dimension defining signals with standard signals wherein difference signals are generated thereby which are indicative of variations in the dimension or dimensions of the tool, e.g. its length or peripheral shape, from a standard such as a properly dimensioned tool when new. The comparator means may be similar to the comparator means of FIG. 2 wherein, when the tool is broken or varies a predetermined degree from a standard, the machine is stopped or a tool changer is operated by a signal generated as described and effects changing the tool with a new or reworked one. If the tool of FIG. 3 is numerically controlled in its operation on the work, a single digital computer may be employed to both control tool operation and analyze the inspection signals generated while the tool operates or in between tool operations on the work. Reference is also made to my copending application Ser. No. 267,377 which provides electronic means for digitizing analog electrical signals which may be employed to provide digital information to automatic analysis circuitry of the type denoted 87,88,89,91 and 93 of FIG. 2 which may be employed to receive digital indications of variations in the length or other dimensions of the tool 54' from the detection and analysis or digitizing circuits described and associated with the system 102.

In FIG. 4 a machine tool head or chuck 103 is shown supporting a tool 104 such as a rotary cutting tool used in a milling or shaping machine, adjacent a mount 105 for a nozzle which may be supported by the described inspection probe arm or the tool head. The nozzle 106 is connected to a source of coolant or cutting liquid under sufficient pressure to eject a stream F thereof from the nozzle against the tool while it is stationary and/or rotates. An ultrasonic vibrator or transducer 108 of the type described is supported within the nozzle and is coupled to the tool, tool head or chuck by the liquid coupling column F created by the flow of liquid from the nozzle. If the nozzle rotates with the spindle, suitable rotary coupling means 100 is provided to couple driving electrical energy and the reflected wave generated signals back to the detection circuitry 102. If the nozzle 106 is supported on a stationery mount adjacent the tool or the described probe arm or arms, the input-output lines 109 may extend directly to the ultrasonic generator and detection system 102. The detection signal output circuits of system 102 are shown connected to a signal analysis and alarm system 111 which contains circuitry of the type described above for digitizing the difference signals generated by the detector and presenting same to comparator or subtraction circuits which are preset or fed with digital signals indicative of a desired dimension or shape of the tool as generated from recordings as provided, for example in FIG. 2. While the fluid stream F of coupling fluid is shown in FIG. 4 as directed oblique or normal to the longitudinal axis of the tool, it may also be flowed substantially longitudinally along the tool or through a passageway extending longitudinally along or in the direction of the work. Thus nozzle 106 may also be supported within the tool chuck or tool head and in engagement with or disposed just off the end of the tool when the tool is properly disposed in operative relation with same.

In yet another form of the invention, the inspection means for the tool and/or work may comprise a transducer of the type described herein mounted on the surface of or within a cavity or bore in the cutting tool itself and connected as described to a suitable energizing signal generator for transmitting inspection and/or tool vibrating energy to the tool for maching purposes, or to enhance the machining characteristics of the tool as it rotates and/or is translated with respect to the work.

Thus, in addition to generating ultrasonic energy for inspection purposes as described, the transducer which is directly or indirectly coupled to the tool may also be operated in a mode to transmit more intense vibrations to the tool to effect or enhance the machining or metal cutting operation of the tool. A single transducer, or a plurality of transducers, may be employed and properly electrically energized to impart both inspection ultrasonic waves to the tool and more intense machining wave energy in the range of 10,000 to 20,000 cycles per second to a single tool either simultaneously or during intervals while the tool is respectively stopped and machining. The described and illustrated constructions and arrangements for tool vibrating means may be utilized to vibrate the tool per se during a machining operation for machining purposes or for inspection purposes per se or both.

In FIG. 5 is shown a tool arrangement including a tool head or chuck 112 supporting a tool 113 such as a rotary cutter operable to be power rotated within or with said head 112 for automatically performing operations on work such as cutting operations. Disposed near the end of the chuck or toolhead 112 is a housing 114 containing one or more electronic transmitter-detectors 115 operable to direct radiation as a beam or in other form denoted 116 towards the tool and to receive reflections of said radiation from said tool. In its simplest form, the transmitter-detector 115 may comprise a photoelectric cell and a light source adjacent thereto for transmitting a beam of light at the tool which is reflected by the tool while stationery or in operation, the reflected energy being detected by the detector in housing 114. The radiation generated by the electrically operated device in housing 114 may comprise other forms of radiation such as radio waves, ultrasonic waves or other radiant energy which will variably reflecte to the detector in housing 114 depending on the shape of the tool 113. If the tool is broken, a substantial reduction or total lack of reflected radiant energy will be effected and may be easily detected by the detector in housing 114. Depending on the characteristics of the transmitted radiant energy and the sensitivity of the detector, tool condition such as wear may also be detected and accounted for as described.

In a particular form of the invention defined in FIG. 5 a laser may be disposed in housing 114 and its beam directed at the end of the tool 113 to detect tool breakage. If used to determine tool condition other than breakage, the beam may be moved to scan the length of the tool and the resulting reflection thereof detected to generate a variable output signal by a suitable photoelectric detector which signal may be automatically analyzed to determine variations from standard in the shape or surface condition of the tool. A laser or electron beam scanning means such as a flying spot scanner may also be employed on a mount supported by the tool base or tool head such as the probe mount of FIG. 2 to automatically scan the tool and determine its length or diameter between tool operations or while it is in operation.

In yet another form of the instant invention, it is noted that the probe manipulator of FIGS. 1 and 2 may be applied to any of the detection devices of FIGS. 3-5 for positioning a transducer or radiant energy generator and detector in operative relation with a tool during its operation or between operations for detecting tool variations as described. The probe manipulator may also contain article manipulation means such as jaws or clamps for also handling a workpiece such as the work being operated on by the tool either during the machining operation thereon by the tool or to and from the work holding fixture which may comprise part of the tool or tool bed. The same computer used to control the tool may be used to control the manipulator in all its described functions.

In other forms of the invention, the probe manipulation means of FIGS. 1 and 2 may be employed to bring a vibrational transducer such as the described ultrasonic transducers into engagement with the tool and/or work to permit the vibrational energy generated thereby to be transmitted to the tool or work for both inspection and machining enhancement purposes. The probe may be controlled as described to cause the transducer to scan and inspect a selected portion of the tool such as the cutting edge portion thereof as well as to inspect the work positioned in alignment with the tool before or during the machining operation. The probe manipulation means described may also be employed to locate and preposition a radiation scanning means such as a laser and photo-optical detector, flying spot scanner, electron gun, X-ray gun or other means with respect to the tool and/or work for inspecting same before or during the machining operation. A single digital computer or controller may be employed as described to control the movement and operation of the scanner and the machine tool as described.

The probe manipulation apparatus of FIGS. 1 and 2 such as the means for positioning and controlling movement of the probe arms 21 and 25 or 57 and 62 or modified forms thereof, may be utilized in combination with a conventional machine tool to effect the performance of a plurality of functions under the control of a single computer including, in addition to the described automatic tool and work inspection functions, the positioning of a work holding head or transfer device to be assembled with the main workpiece being machined, the positioning of auxilliary machining means such as a power driven tool, laser or electron gun with respect to the work, the positioning of auxilliary material such as welding material or coating material with respect to the work or tool, etc. The unitary measuring probe mount described may also be replaced by a turret containing different probes and tools.

In a particular form of the invention, both a work engaging tool and an intense radiation beam generator such as a laser or electron gun may be supported on a common probe arm such as any of those denoted 21,25 or 57,62 in the drawings or modified forms thereof and may cooperate to machine material of the work by heating a selected portion of the work with the beam of the laser or electron gun and, as such laser or gun is moved on the probe mount as described, heat softened material is removed by the tool and either or both the tool and work move. The work may be rotated, as in a lathe, or held stationery while the probe arm together with the tool and beam generator are driven with respect to the work.

Figure 6:
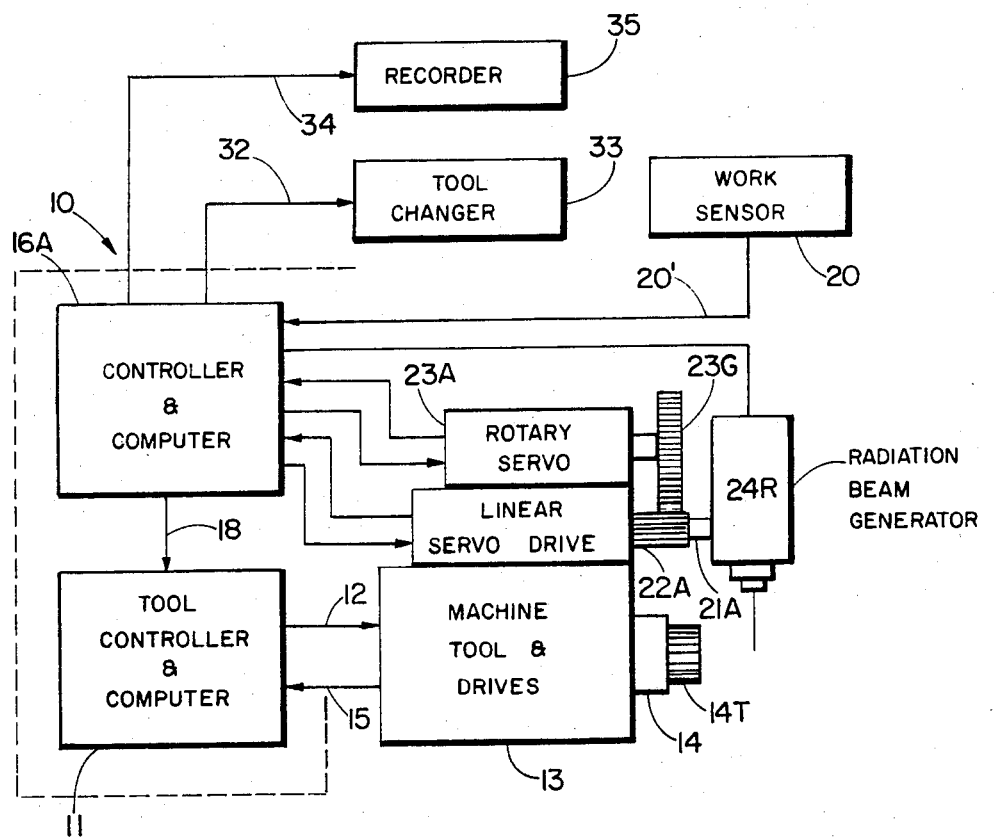
FIG. 6 is a block diagram of one form of the invention.

A tool arrangement as defined above is illustrated in FIG. 6 of the drawings.

What is claimed is:

1. A method of machining material comprising:
    effecting first powered controlled movement of a tool with respect to a work member,
    effecting second powered controlled movement of a radiation generating means with respect to said tool
    transferring sufficient heat from said radiation generating means to cause a selected portion of a work member to become heat softened,
    controlling the operation of said tool to cause it to engage the heat softened portion of said work member, and
    continuing said first and second controlled movements of said tool and said radiation generating means while said tool is in engagement with said work member to cause said tool to remove at least a portion of said selected portion of said work member heated to said heat softened condition by said radiation generating means.

2. A method in accordance with claim 1 which includes supporting said radiation generating means and said tool on a common support to permit said radiation generating means to generate and direct radiation against said work member as it is moved with said tool when said first powered controlled movement moves said tool.

3. A method in accordance with claim 1 wherein said radiation generating means is operable to generate a narrow beam of radiation and to direct said narrow beam to intersect material of said work member immediately in advance of said tool.

4. A method in accordance with claim 3 wherein said radiation generating means is a laser operable to generate a narrow beam of coherent radiation.

5. A method in accordance with claim 3 wherein said radiation generating means is operable to generate said narrow beam of intense radiation intermittently.

6. A method in accordance with claim 1 which includes automatically controlling the operation of said tool and the generation of said radiation.

7. A method in accordance with claim 6 which includes computer controlling the operation of said tool and said radiation generating means.

* * * * *